L. C. VAN RIPER.
STARTING DEVICE FOR EXPLOSIVE ENGINES.
APPLICATION FILED JAN. 25, 1911.
1,129,250.
Patented Feb. 23, 1915.
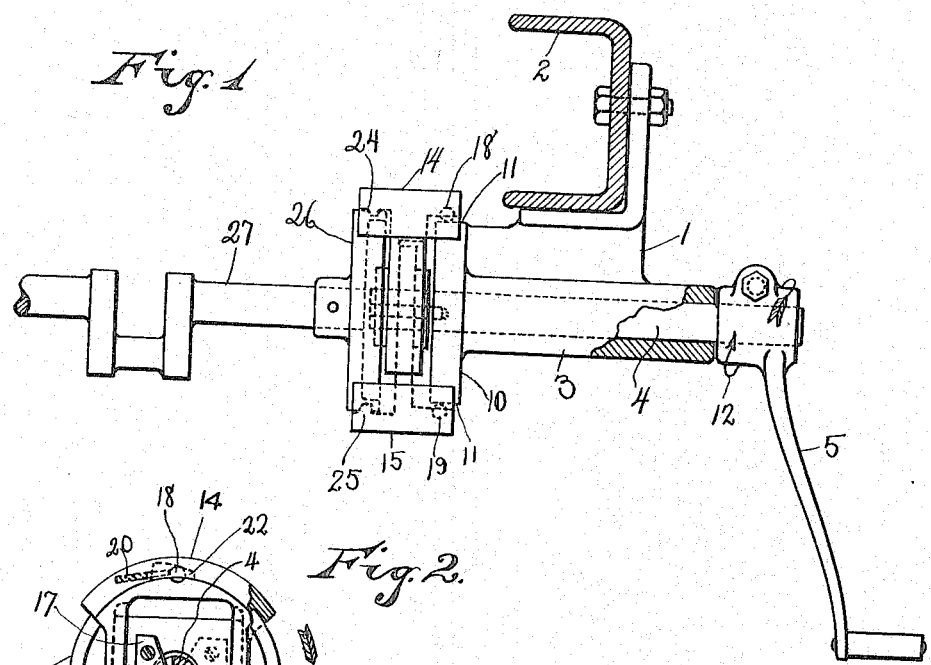
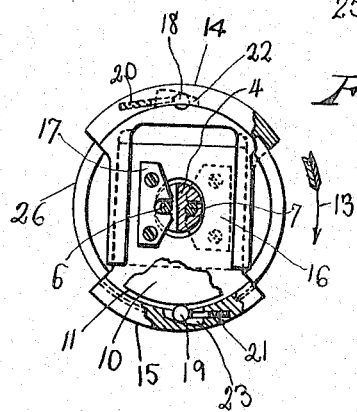
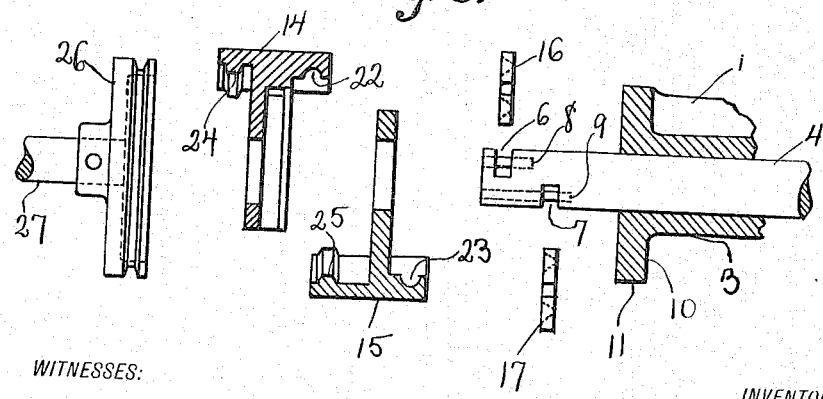
WITNESSES:
Abraham Novich
Frances Gigel
INVENTOR
Lewis C. Van Riper
BY
George Finkelstein
ATTORNEY

UNITED STATES PATENT OFFICE.

LEWIS C. VAN RIPER, OF NEW YORK, N. Y.

STARTING DEVICE FOR EXPLOSIVE-ENGINES.

1,129,250. Specification of Letters Patent. Patented Feb. 23, 1915.

Application filed January 25, 1911. Serial No. 604,565.

*To all whom it may concern:*

Be it known that I, LEWIS C. VAN RIPER, a citizen of the United States, and a resident of New York, in the county of New York and State of New York, have invented certain new and useful Improvements in Starting Devices for Explosive-Engines, of which the following is a specification.

The purpose of my invention is to provide a starting device which will release the starting crank or starting mechanism with absolutely no backward rotation of said starting crank or starting mechanism when a premature explosion or back fire occurs, so as to prevent injury to the person or mechanism employed in operating the starting device, and is an improvement upon two pending applications for Letters Patent filed by me in the United States Patent Office as follows: September 12, 1910, Serial No. 581,600, October 6, 1910, Serial No. 585,577, and two pending applications filed by me jointly with Abraham Novick as follows: November 30, 1910, Serial No. 594,834, and December 14, 1910, Serial No. 597,335, in both of which I have acquired the entire interest of said Abraham Novick by assignments duly recorded in the United States Patent Office.

The improvements shown herein are intended to simplify the construction and to provide a form of starting device that may be used in engines where other forms might be found unsuitable.

Reference is to be had to the accompanying drawings forming a part of this specification in which similar characters of reference indicate corresponding parts in all the figures wherein:

Figure 1 is a side view of this device partly in section attached to an automobile frame, Fig. 2 is an end view partly in section showing the clutches in this device, Fig. 3 shows several of the principal parts in detail.

My improved starting device consists of a supporting member 1 that may be fastened to the front cross member 2 of an automobile frame and carries the crank handle shaft 4 in the bearing 3 which forms a part of the supporting member 1. At one end of the bearing 3 is the flange 10, on the periphery of which is the non-rotatable friction roller race 11. At one end of the crank handle shaft 4 is fastened the crank handle 5 and at the other end are the slots 6 and 7 with the engaging pins 8 and 9 respectively therein for the purpose of engaging the sliding members 14 and 15 through the plates 16 and 17, plate 16 being fastened to the sliding member 14 and plate 17 to the sliding member 15 (see Fig. 2). Upon forward rotation of the crank handle 5 in the direction of the arrow 12 of Fig. 1 and the arrow 13 of Fig. 2 the sliding members 14 and 15 which form what is known to the art as a contracting friction clutch are caused to contract and the friction shoes 24 and 25, which are parts of the sliding members 14 and 15 respectively, frictionally grip the friction disk 26 said friction disk 26 being fastened to the engine shaft 27.

The above mentioned gripping can only take place after the crank handle shaft 4 has been rotated in the direction of arrows 12 and 13 until the balls or friction rollers 18 and 19 are forced against their respective springs 20 and 21 to the deeper ends of their respective inclined grooves 22 and 23 by the said forward rotation and the non-rotatable friction roller race 11 and any continued forward rotation of the crank handle shaft 4 is transmitted to the engine shaft 27. When the engine starts forward under its own power after being rotated as above explained the increased speed of the engine shaft 27 over the speed of the crank handle shaft 4 will automatically release the friction disk 26 from the grip of the friction shoes 24 and 25, by means of the crank handle shaft 4 rotating slower than the clutch members 14 and 15 thereby causing the engaging pins 8 and 9 to expand the clutch members 14 and 15 which releases the friction disk 26.

When a premature explosion or back fire occurs the engine revolves the engine shaft 27 in a backward direction (opposite to the arrows 12 and 13) and in so doing attempts to drag along the crank handle shaft 4 and crank handle 5 but is prevented from doing so by means of the aforesaid friction rollers 18 and 19 becoming wedged between the bottom of their respective inclined grooves 22 and 23 and the non-rotatable friction roller race 11. This wedging of the friction rollers transfers to these friction rollers the pressure that held the friction shoes 24 and 25 connected to the friction disk 26 thereby reducing the friction that held the friction shoes 24 and 25 connected to the friction disk 26 and allows the engine shaft 27 to rotate backward with no backward rotation of the crank handle 5.

What I claim, is:

1. In a starting device adapted to be used in connection with explosive engines, the combination of a friction surface upon or connected to an engine shaft, a contracting friction clutch comprising radially slidable members, means at all times rotatable either forward or backward for connecting and disconnecting said friction clutch to an engine shaft through said friction surface as said connecting means is rotated either forward or backward.

2. In a starting device adapted to be used in connection with explosive engines, the combination of a friction surface upon or connected to an engine shaft, a contracting friction clutch comprising radially slidable members, means at all times rotatable either forward or backward for rotating and frictionally connecting said clutch to the engine shaft through said friction surface at one forward operation of said rotating means, and means for reducing the friction between said contracting friction clutch and said friction surface upon the backward rotation of said engine shaft.

3. In a starting device adapted to be used in connection with explosive engines, the combination of a friction surface upon or connected to an engine shaft, a rotatable contracting friction clutch comprising radially slidable members, means at all times rotatable either forward or backward for rotating and contracting said friction clutch upon forward rotation, and means for expanding said friction clutch upon backward rotation of any of the rotatable means or instrumentalities.

4. In a starting device adapted to be used in connection with explosive engines, the combination of a friction surface upon or connected to an engine shaft, a rotatable contracting friction clutch comprising radially slidable members, means at all times rotatable either forward or backward for rotating and contracting said friction clutch upon forward rotation, a non-rotatable friction roller race and one or more friction rollers between said roller race and clutch members for expanding said friction clutch upon backward rotation of any of the said rotatable means or instrumentalities.

5. In a starting device adapted to be used in connection with explosive engines, the combination of a friction surface upon or connected to an engine shaft, a rotatable contracting friction clutch comprising radially slidable members, means at all times rotatable either forward or backward for rotating and contracting said friction clutch upon forward rotation, a non-rotatable friction roller race, one or more friction rollers, an inclined groove or grooves for said friction roller or rollers, and means for keeping said friction roller or rollers always in frictional engagement with said non-rotatable friction roller race, and the inclined surface of said inclined groove or grooves.

6. In a starting device adapted to be used in connection with explosive engines, the combination of a friction surface upon or connected to an engine shaft, a rotatable contracting friction clutch comprising radially slidable members, means at all times rotatable either forward, for frictionally connecting, or backward for disconnecting said contracting friction clutch to or from said friction surface by a single operation of said rotatable means, a non-rotatable friction roller race, friction rollers, and means for keeping constant the frictional connection of said friction rollers with said non-rotatable friction roller race.

7. In a starting device adapted to be used in connection with explosive engines, the combination of a friction surface upon or connected to an engine shaft, a rotatable contracting friction clutch comprising radially slidable members, means at all times rotatable either forward or backward for rotating and for contracting said friction clutch upon forward rotation at a single operation, a non-rotatable friction roller race and one or more friction rollers always frictionally connecting said friction clutch with said non-rotatable race, to provide for relative backward movement between the cranking shaft and engine shaft so that the friction clutch can be expanded upon backward rotation of any of the said rotatable means or instrumentalities.

8. In a starting device adapted to be used in connection with explosive engines, the combination of a friction surface upon or connected to an engine shaft, a contracting friction clutch comprising radially slidable members, means at all times rotatable either forward or backward for rotating and operating said clutch to frictionally connect same to an engine shaft at a single forward operation through said friction surface to move connectedly in one direction only, and means for automatically reducing the friction between said contracting friction clutch and said friction surface when said engine shaft rotates in a backward direction.

9. In a starting device adapted to be used in connection with explosive engines, the combination of a friction surface upon or connected to an engine shaft, a contracting friction clutch, means at all times rotatable either forward or backward for rotating and frictionally connecting said clutch to an engine shaft through said friction surface upon the forward rotation of said rotating means, at a single operation and means for reducing the friction between said friction clutch and said friction surface when the power applied in the reverse direction by said engine exceeds the pressure applied in a forward direction to said rotating means.

10. In a starting device adapted to be used in connection with explosive engines, the combination of a friction surface upon or connected to an engine shaft, a rotatable contracting friction clutch comprising radially slidable members, means at all times rotatable either forward or backward for rotating and frictionally connecting said friction clutch to said friction surface upon forward rotation at a single operation of said rotating means, a non-rotatable friction roller race and means for keeping the said friction clutch members always frictionally connected to the said non-rotatable friction roller race so as to reduce the friction between said friction clutch and said friction surface upon backward rotation of any of the said rotatable means or instrumentalities.

11. In a starting device adapted to be used in connection with explosive engines, the combination of a friction surface upon or connected to an engine shaft, a rotatable contracting friction clutch comprising radially slidable members, means at all times rotatable either forward or backward for rotating and frictionally connecting said friction clutch to said friction surface at a single forward operation of said rotating means, a non-rotatable friction roller race and means for keeping the said friction clutch members always frictionally connected to the said non-rotatable roller race so as to reduce the friction between said friction clutch and said friction surface upon backward rotation of the said engine shaft.

12. In a starting device adapted to be used in connection with explosive engines, the combination of a friction surface upon or connected to an engine shaft, a rotatable contracting friction clutch comprising radially slidable members, means at all times rotatable either forward or backward for rotating and frictionally connecting said friction clutch to said friction surface upon forward rotation only of said rotating means, a non-rotatable friction roller race and means for keeping the said friction clutch member always frictionally connected to the said non-rotatable friction roller race so as to reduce the friction between said friction clutch and said friction surface upon backward rotation of said engine shaft.

13. In a starting device adapted to be used in connection with explosive engines, the combination of a friction surface upon or connected to an engine shaft, a contracting friction clutch comprising radially slidable members, means at all times rotatable either forward or backward for rotating and for frictionally connecting said friction clutch to said engine shaft when a forward impulse only is applied to the said friction clutch and means for reducing the friction between said friction clutch and said friction surface when a backward impulse that is greater than the forward impulse of said rotating means is applied to the engine shaft by said engine.

14. In a starting device adapted to be used in connection with explosive engines, the combination of a friction surface upon or connected to an engine shaft, a rotatable contracting friction clutch comprising radially slidable members, means at all times rotatable either forward or backward for rotating, contracting and frictionally connecting said clutch to said friction surface upon forward rotation only of said rotating means and means for reducing the friction of said frictional connection upon backward rotation of said engine shaft, said friction reducing means comprising a non-rotatable friction roller race, an inclined friction roller groove, integral with each member of the said friction clutch, a friction roller in each inclined groove and a spring behind said friction roller to hold said friction roller always in frictional engagement with the bottom of said inclined groove and the non-rotatable friction roller race.

15. In a starting device adapted to be used in connection with explosive engines, the combination of an annular grooved friction surface upon or connected to an engine shaft, a contracting friction clutch having shoes shaped to engage said friction surface, means at all time rotatable either forward or backward for rotating and frictionally connecting said friction clutch to said engine shaft through said friction surface to rotate connectedly in a forward direction only.

Signed at New York in the county of New York and State of New York this 23rd day of January A. D. 1911.

LEWIS C. VAN RIPER.

Witnesses:
ABRAHAM NOVICK,
ISIDORE FINKELSTEIN.

Copies of this patent may be obtained for five cents each, by addressing the "Commissioner of Patents, Washington, D. C."